Patented Dec. 4, 1951

2,576,916

UNITED STATES PATENT OFFICE 2,576,916

FRIT COMPOSITIONS FOR VITREOUS ENAMELS

Malcolm D. Beals, Plainfield, and Laurence R. Blair, New Brunswick, N. J., assignors to National Lead Company, New York, N. Y., a corporation of New Jersey No Drawing. Application August 10, 1950,
Serial No. 178,754

2 Claims. (Cl. 106—48)

This invention relates to frit compositions for use in preparing vitreous enamels. More specifically it relates to frit compositions useful in preparing vitreous enamels which mature at low temperatures.

Many types of frit compositions have been proposed and used in the vitreous enameling industry. Many of the prior art compositions, however, mature at relatively high temperatures, i. e. above 825° C. The development of frit compositions which are capable of producing vitreous enamels which have low maturing temperatures has been the goal in the enamel field for many years. It is particularly desirable to produce frit compositions which are capable of producing vitreous enamels which will mature at a temperature of 825° C. or below, preferably below 725° C. At firing temperatures in excess of 825° C. difficulties are encountered in obtaining kiln construction materials which will hold up or have a long life, which is an essential feature of an economical and satisfactory operation. It is particularly advantageous to produce frit compositions which will mature below 725° C. because most enameling steels undergo a volume change above 725° C. which causes warpage in large enamel sections. If the maturing temperature of the vitreous enamels occurs below 725° C., warpage in the enameling steel would be considerably reduced or substantially eliminated. With such vitreous enamels cheaper grades of sheet steel and lighter gauge steel may be employed. Furthermore, the low maturing temperatures result in more efficient utilization of heat, longer life of kiln construction materials, and less maintenance, thereby reducing the operating costs considerably.

An object of this invention, therefore, is to produce frit compositions which are capable of forming vitreous enamels which will mature at temperatures below 825° C. A further object is to produce preferred frit compositions which are capable of forming vitreous enamels which will mature at temperatures below 725° C. These and other objects will become apparent from the following more complete description of the present invention.

In its broadest aspects this invention contemplates forming a frit composition which is capable of forming enamels which will mature between 650° C. and 825° C. comprising oxides of aluminum, boron, phosphorus, alkali metals, and titanium. A preferred embodiment of the present invention is to form a frit composition which is capable of forming a vitreous enamel which will mature at a temperature between 650° C. and 725° C. which contains the same ingredients mentioned above.

The frit composition capable of forming a vitreous enamel maturing below 825° C. comprises the following: 6% to 12% $TiO_2$, 18% to 37% $P_2O_5$, 19% to 39% $Al_2O_3$, 7% to 37% $B_2O_3$, 14% to 23% alkali metal oxide; the sum of the alkali metal oxide and the $P_2O_5$ equal to 58% to 85% of the sum of the alkali metal oxide, the $P_2O_5$ and the $B_2O_3$; when the $B_2O_3$ is less than 22%, the $Al_2O_3$ must be at least 23%; when the $B_2O_3$ is at least 22%, the $P_2O_5$ must be less than 31%; the alkali metal oxide selected from the group consisting of $Na_2O$ and $Na_2O$ in combination with $K_2O$ and $Li_2O$; the $K_2O$ in amount to replace up to 60% of the $Na_2O$; the $Li_2O$ in amount to replace up to 20% of the $Na_2O$.

The compositions which are capable of forming a vitreous enamel which will mature below 725° C. comprise the following: 6% to 12% $TiO_2$, 18% to 37% $P_2O_5$, 19% to 36% $Al_2O_3$, 11% to 33% $B_2O_3$, 18% to 23% alkali metal oxide; the sum of the alkali metal oxide and the $P_2O_5$ equal to 62% to 83% of the sum of the alkali metal oxide, the $P_2O_5$ and the $B_2O_3$; when the $B_2O_3$ is less than 22%, the $Al_2O_3$ must be at least 23%; when the $B_2O_3$ is at least 22%, the $P_2O_5$ must be less than 31%; the alkali metal oxide selected from the group consisting of $Na_2O$ and $Na_2O$ in combination with $K_2O$ and $Li_2O$; the $K_2O$ in amount to replace up to 30% of the $Na_2O$; the $Li_2O$ in amount to replace up to 20% of the $Na_2O$.

In order to more fully illustrate the present invention the following examples are presented to illustrate the method by which a frit composition is prepared:

EXAMPLE I

*Preparation of a frit composition capable of forming a vitreous enamel which will mature below 825° C.*

The following ingredients were dry blended to form a mixture:

| Ingredients | Parts by Weight |
|---|---|
| $Al(PO_3)_3$ | 30.6 |
| $Na_2CO_3$ | 24.9 |
| $NaNO_3$ | 6.8 |
| $H_3BO_3$ | 30.5 |
| $Al_2O_3.3H_2O$ | 38.5 |
| $TiO_2$ | 8.0 |

The mixture was then placed in a fire clay crucible and melted at 1300° C. for 40 minutes at which time the mass appears to be homogeneous and free from undissolved material. The molten bath was then removed from the furnace and quenched in water to form a frit material. The frit was then dried at 100° C. The dried material was then ground for 10 hours in a procelain ball mill at which time the ground material was screened through a 200 mesh sieve. 95% of the frit material passed through the screen. The minus 200 mesh material was used as the frit composition from which a vitreous enamel was prepared.

*Preparation of vitreous enamel*

100 parts of the minus 200 mesh frit material were intimately mixed with 45 parts of water containing 0.5 parts NaAlO₂ to form a slip. The slip formed was then sprayed on ground-coated enameling steel panels to a thickness equal to 30 grams per sq. ft. (dry weight). The coated panel was dried at 110° C. and then fired to mature the enamel. A temperature of 775° C. for 3 minutes was required with this particular composition to mature the enamel. The frit material had the following composition:

| Ingredient | Per Cent by Weight |
|---|---|
| $Al_2O_3$ | 31.7 |
| $P_2O_5$ | 25.2 |
| $B_2O_3$ | 17.5 |
| $Na_2O$ | 17.4 |
| $TiO_2$ | 8.2 |

EXAMPLE II

*Preparation of a frit composition capable of forming a vitreous enamel which will mature below 725° C.*

The following ingredients were dry blended to form a mixture.

| Ingredients | Parts by Weight |
|---|---|
| $NaH_2PO_4 \cdot H_2O$ | 66.3 |
| $NaNO_3$ | 9.0 |
| $H_3BO_3$ | 21.1 |
| $Al_2O_3 \cdot 3H_2O$ | 42.8 |
| $TiO_2$ | 7.8 |

This mixture was placed in a fire clay crucible and melted at 1300° C. for 30 minutes. The molten mass was removed from the furnace and quenched in water to form the frit material. The frit was then dried and ground for 10 hours in a procelain ball mill at which time the material was screened through a 200 mesh sieve. 97% of the frit material passed through this screen.

*Preparation of vitreous enamel*

A slip was prepared from this frit composition using the procedure described in Example I and was sprayed on a steel panel. The coated panel was then fired to mature the enamel. A temperature of 700° C. for 3 minutes was required with this particular composition to mature the enamel. The frit material had the following composition:

| Ingredient | Per Cent by Weight |
|---|---|
| $Al_2O_3$ | 28.0 |
| $P_2O_5$ | 34.1 |
| $B_2O_3$ | 11.9 |
| $Na_2O$ | 18.2 |
| $TiO_2$ | 7.8 |

By the present invention, it is possible to prepare frit compositions from which vitreous enamels may be prepared which will mature at temperatures below 825° C. and preferably below 725° C.

The vitreous enamels produced from these frit compositions possess a uniform and glossy surface which is hard and durable and is resistant to acids. These enamels also possess an exceptionally white color with high opacity which is useful for coating many articles of manufacture.

While this invention has been described and illustrated by the examples shown, it is not intended to be strictly limited thereto and other modifications and variations may be employed within the scope of the following claims.

We claim:

1. A frit composition capable of forming a vitreous enamel which matures at temperatures between 650° C. and 825° C. which comprises from 6% to 12% $TiO_2$, 18% to 37% $P_2O_5$, 19% to 39% $Al_2O_3$, 7% to 37% $B_2O_3$, 14% to 23% alkali metal oxide; the sum of the alkali metal oxide and the $P_2O_5$ equal to 58% to 85% of the sum of the alkali metal oxide, the $P_2O_5$ and the $B_2O_3$; when the $B_2O_3$ is less than 22%, the $Al_2O_3$ must be at least 23%; when the $B_2O_3$ is at least 22%, the $P_2O_5$ must be less than 31%; the alkali metal oxide selected from the group consisting of $Na_2O$ and $Na_2O$ in combination with $K_2O$ and $Li_2O$; the $K_2O$ in amount to replace up to 60% of the $Na_2O$; the $Li_2O$ in amount to replace up to 20% of the $Na_2O$.

2. A frit composition capable of forming a vitreous enamel which matures at temperatures between 650° C. and 725° C. which comprises from 6% to 12% $TiO_2$, 18% to 37% $P_2O_5$, 19% to 36% $Al_2O_3$, 11% to 33% $B_2O_3$, 18% to 23% alkali metal oxide; the sum of the alkali metal oxide and the $P_2O_5$ equal to 62% to 83% of the sum of the alkali metal oxide, the $P_2O_5$ and $B_2O_3$; when the $B_2O_3$ is less than 22%, the $Al_2O_3$ must be at least 23%; when the $B_2O_3$ is at least 22%, the $P_2O_5$ must be less than 31%; the alkali metal oxide selected from the group consisting of $Na_2O$ and $Na_2O$ in combination with $K_2O$ and $Li_2O$; the $K_2O$ in amount to replace up to 30% of the $Na_2O$; the $Li_2O$ in amount to replace up to 20% of the $Na_2O$.

MALCOM D. BEALS.
LAURENCE R. BLAIR.

No references cited.